United States Patent [19]

Brandl et al.

[11] Patent Number: 4,933,958
[45] Date of Patent: Jun. 12, 1990

[54] METHOD FOR RECEIVING CARRIER OSCILLATIONS MODULATED WITH A USEFUL SIGNAL

[75] Inventors: Hans Brandl, Munich, Fed. Rep. of Germany; Burghard Unteregger, Vienna, Austria

[73] Assignee: Siemens Aktiengesellschaft, Berlin and Munich, Fed. Rep. of Germany

[21] Appl. No.: 280,817

[22] Filed: Dec. 7, 1988

[30] Foreign Application Priority Data

Dec. 17, 1987 [DE] Fed. Rep. of Germany ....... 3742865

[51] Int. Cl.$^5$ .............................. H03D 3/22
[52] U.S. Cl. ..................... 375/85; 455/142; 329/308
[58] Field of Search ..................... 375/83, 118, 86, 39, 375/10, 8, 9, 84, 85; 455/313, 227, 142; 324/77 R, 77 A, 77 B; 328/155; 329/1, 2, 110, 124, 304, 308, 345

[56] References Cited

U.S. PATENT DOCUMENTS

| | | | |
|---|---|---|---|
| 3,843,931 | 10/1974 | Sarkilahti | 329/110 |
| 4,470,147 | 9/1984 | Goatcher | 329/1 |
| 4,546,322 | 10/1985 | Crutcher | 375/83 |
| 4,731,796 | 3/1988 | Masterton et al. | 455/142 |
| 4,804,924 | 2/1989 | Chassaing et al. | 329/1 |

FOREIGN PATENT DOCUMENTS

3414969C2  11/1984  Fed. Rep. of Germany .

OTHER PUBLICATIONS

"Der Fernmelde-Ingenieur", Zeitschrift fur Ausbildung and Fortbildung, 1984, pp. 1-56.
"Datenubertragung uber das Telefonnetz", CCITT--Empfehlungen der V-Serie und der X-Serie 5., erweiterte Auflage, 1985, pp. 130-233.
"Understanding PSK Demodulation Techniques", by J. Mark Steber, Microwaves & RF, Mar. 1984, pp. 137-145.
"Microprocessor Implementation of High-Speed Data Modems", by Piet J. Van Gerwen et al., Data Communication Systems of the IEEE Communications Society, Sep. 27, 1976, pp. 238-250.

Primary Examiner—Benedict V. Safourek
Assistant Examiner—Marianne Huseman
Attorney, Agent, or Firm—Hill, Van Santen, Steadman & Simpson

[57] ABSTRACT

Method for receiving carrier oscillations modulated with a useful signal. For a universal transmitting-/receiving device, a method for the automatic adaptation of its modem to the type of modulation of the incoming signal is provided in which the incoming DPSK signal is first demodulated. The demodulator output signal is then converted into a polar co-ordinate representation and, after formation of the difference phase angle ($\Delta\phi$), its value frequency (H) is represented modulo 90° in a histogram which can be evaluated for derivation of the control information.

13 Claims, 4 Drawing Sheets

4,933,958

METHOD FOR RECEIVING CARRIER OSCILLATIONS MODULATED WITH A USEFUL SIGNAL

BACKGROUND OF THE INVENTION

The present invention relates to a method for receiving signals in the for of carrier oscillations modulated by a useful signal, in which the type of modulation used for an incoming signal is first determined with a histogram and from this, control information is produced for adapting a circuit recovering the original signal to the type of modulation determined.

A radio receiving device or Morse Code signals or teletype signals, which makes use of such a method and in which the incoming signal is first supplied to a computing circuit which generates from it a histogram of signal frequencies plotted against time, is disclosed, for example, in German reference No. DE 3 414 969 C2. This generated histogram is then compared with model histograms stored in a memory and via this comparison the type of modulation of the received signal is determined. Following the determination of the type of modulation, the discriminator is adapted to this type of modulation and the received signal is fed to the discriminator.

As has been found, such a method is of significance not only in receiving devices for radio signal monitoring, but also in networks for information and data transmission if in such a network groups of transmitting-/receiving devices exist which exhibit different types of modems. In that case, only transmitting/receiving devices exhibiting the same type of modem can ever communicate with one another. Such networks are mandatorily produced in the international co-operation of institutions, the transmitting/receiving devices of which meet different CCITT recommendations with respect to the type of modulation used.

If a subscriber with priority in such a network has the requirement to be able to communicate with any of the remaining subscribers of the network if necessary, a universal transmitting/receiving device is needed which, with respect to its modem, can be adapted to the type of modem of the distant station.

Basically, of course, the possibility exists to equip such a universal transmitting/receiving device with several types of modems and, before the signal transmission, to activate the type of modem used at the distant station in the local receiver, for example by means of a consultation. Apart from the fact that such a universal transmitting/receiving device necessitates a relatively large technical expenditure which has great disadvantages especially for mobile use (increased weight, increased volume, increased power requirement), it must also be possible to set up a connection quickly if the type of modem of the transmitting station is not known to the universal transmitting/receiving device.

SUMMARY OF THE INVENTION

Starting with a network which exhibits groups of transmitting/receiving devices which differ from one another by the differential phase modulation (DPSK) used, the invention is based on the object of providing for a universal transmitting/receiving device designed for all DPSK types permitted in the network a method for automatically adapting the modem to the type of DPSK of an incoming signal which operates extremely reliably and only needs little additional equipment expenditure.

According to the invention, this object is achieved by a method for receiving signals in the form of carrier oscillations modulated by a useful signal, in which the type of modulation used for an incoming signal is first determined with the aid of a histogram and from this control information is produced for adapting a circuit recovering the original signal to the type of modulation determined. In the method the incoming signal, onto the carrier oscillation of which the useful digital signal is modulated by using a predetermined phase modulation, is first demodulated. Subsequently a pair of signals recovered by this means, namely an in-phase signal ($I'(nT)$) and a quadrature signal ($Q'(nT)$) is fed, on the one hand, to a decoding arrangement and, on the other hand, after conversion into a polar co-ordinate representation specifying phase angle ($\phi$) and absolute value (A) and forming a difference phase angle ($\Delta\phi$) between successively following values, is represented in a histogram indicating a value frequency (H) in a quadrant. The control information derived with the aid of the histogram is fed to the decoding arrangement in the form of a control signal (st1), used for phase adjustment for a decision circuit in the decoding arrangement, and of a control signal (st2) for a decoder in the decoding arrangement. The predetermined phase modulation can be either a four-phase differential phase modulation (4 DPSK) in two possible variants or a sixteen-phase differential quadrature amplitude modulation (16 DQAM).

The invention is based on the finding that it is very advantageous for the recognition of the DPSK of an incoming signal to relate the frequency of values to a single quadrant and to evaluate the accumulation peaks produced in this process, because this evaluation of peaks can also still be correctly performed with a small signal/noise ratio.

It has also been found that the additional equipment expenditure with respect to the modem of such a universal transmitting/receiving device can be held within very narrow limits in practice because the DPSK types V22 bis and V26 bis A/B used here (compare CCITT recommendations of the V series and of the X series, 5th expanded edition, Volume 1, "Data transmission over the telephone network", R. V. Decker's Verlag, G. Schenck, Heidelberg 1985) only require an adjustable phase-rotating element and a change-over switch as additional expenditure for the receiving side of the modem.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

As can be seen, for example, in a German reference "Der Fernmelde-Ingenieur" (The telecommunications engineer), Zeitschrift fur Ausbildung und Fortbildung ("Journal for basic and advanced training), Verlag fur Wissenschaft und Leben George Heidecker, Bad Windsheim, Volume 38, Issue 11/12, 1984, differential phase modulation (DPSK) is used for transmitting useful digital signals in a narrowly limited frequency band, for example the voice band.

Figure 1:
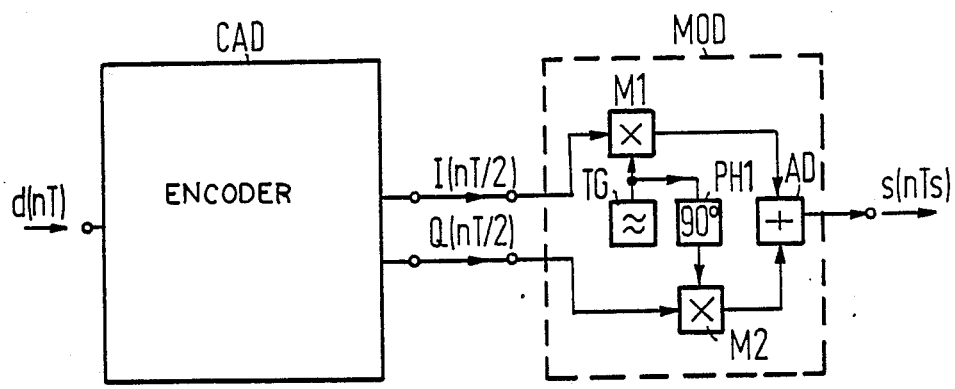
FIG. 1 is a diagrammatic representation of the transmitting side of a modem of a transmitting/receiving device for DPSK.

FIG. 1 shows in a diagrammatic representation the transmitting side of the modem of a transmitting/receiving device. The useful digital information d(nT), for example having a bit rate of 2400 bit/sec, is converted into a pair of signals, namely an in-phase signal I(nT/2) and a quadrature signal Q(nT/2) with 1200 baud in each case, via an encoding arrangement CAD. This pair of signals is fed to the modulator MOD, the input of which consists of two mixers M1 and M2. The mixers M1 and M2 are supplied at the second input with the carrier oscillation of, for example, 1800 Hz from a carrier generator TG, specifically the mixer M1 being supplied directly and the mixer M2 being supplied via a 90° phase-rotating element PH1. The phase modulation of the carrier oscillation by the in-phase signal I(nT/2) performed in the mixer M1, on the one hand, and the carrier oscillation phase-modulated by the quadrature signal Q(nT/2) in the mixer M2, are combined via the adder AD to form the differential pulse phase-modulated outgoing signal s(nTs) and this signal is transmitted to the remote distant station in the base band or, after conversion, at a higher frequency.

Depending on the construction of the encoding device CAD, the differential pulse phase-modulated outgoing signal s(nTs) exhibits two or more different phase positions.

Figure 2:
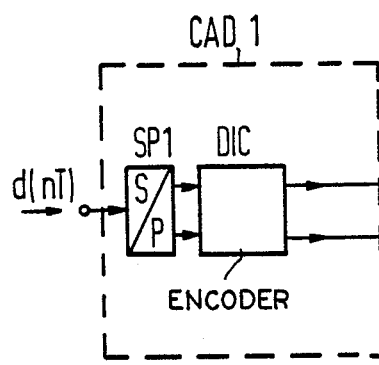
FIG. 2 is a basic circuit diagram of an encoding arrangement for 4 DPSK according to FIG. 1.
Figure 3:
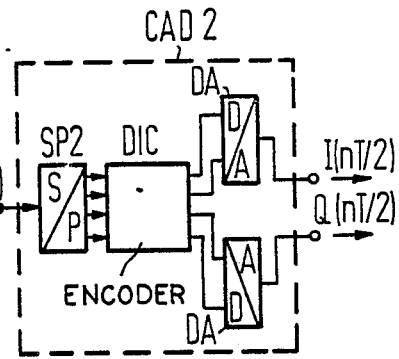
FIG. 3 is a diagrammatic representation of an encoder for 16 DQAM according to FIG. 1.

In the present case, only block diagrams for encoding arrangements designed for the case of a 4 DPSK and a 16 DQAM, which are of significance in practice, are represented in FIGS. 2 and 3.

The encoding arrangement CAD1 according to FIG. 2, which is designed for 4 DPSK, exhibits at its input a serial/parallel converter SP1 which divides the useful digital information d(nT) with the bit rate of 2400 bit/sec into two parallel bit streams of 1200 bit/sec in each case and feeds these to the subsequent difference encoder DIC. The difference encoder DIC supplies at its output the aforementioned pair of signals of the in-phase signal I(nT/2) and the quadrature signal Q(nT/2).

The encoding device CAD2, according to FIG. 3 which is dimensioned for 16 DQAM, also exhibits at its input a serial/parallel converter SP2 which divides the useful digital input information d(n2T) with a bit rate of 2400 bit/sec in each case and feeds these to the difference encoder DIC in accordance with FIG. 3. One bit pair in each case at the output of the difference encoder DIC is fed to a digital/analog converter DA, and one digital/analog converter DA delivers at its output the in-phase signal I(nT/2) and the other digital/analog converter DA delivers at its output the quadrature signal Q(nT/2).

Figure 4:
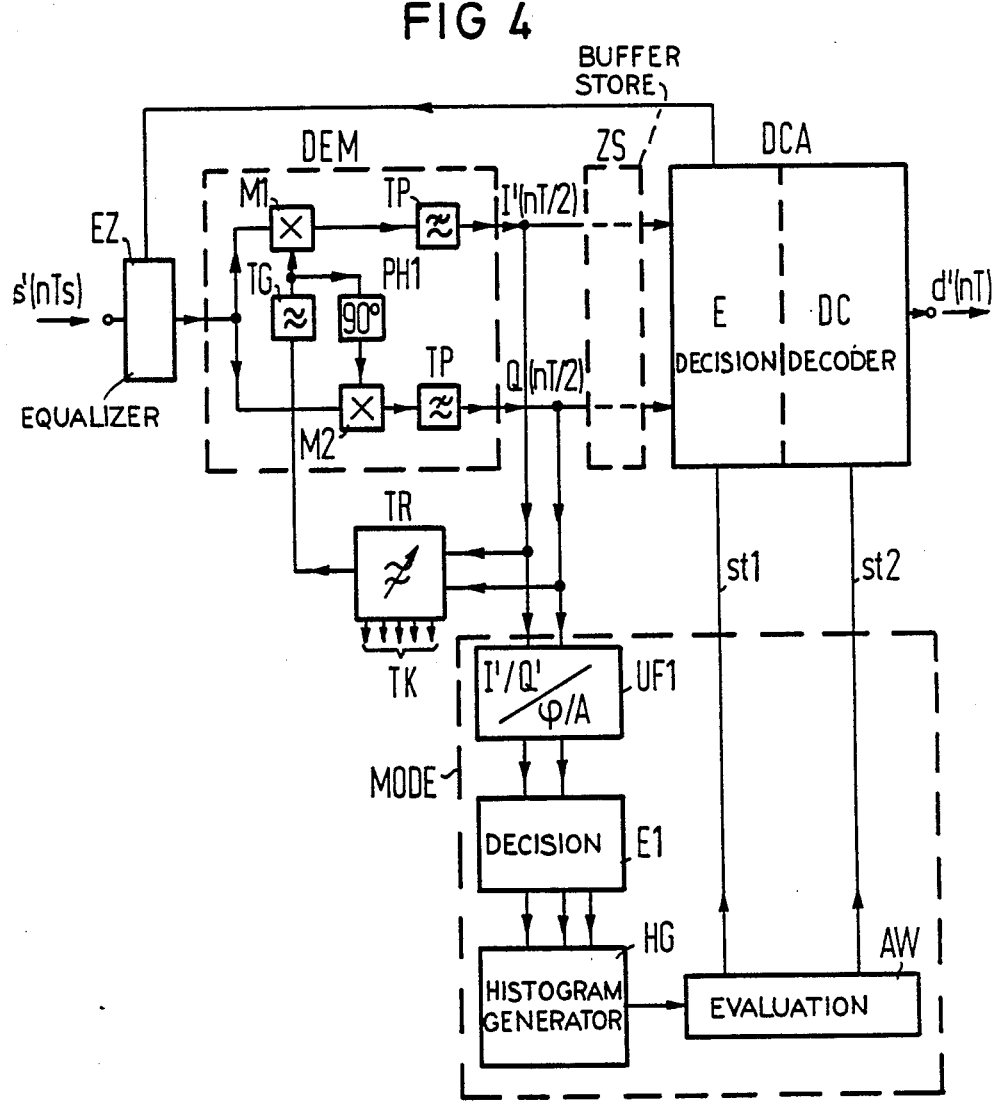
FIG. 4 is a diagrammatic representation of a receiving side, which makes use of the method according to the invention, of a modem of a universal transmitting receiving device.

Referring now to FIG. 4, the basic circuit diagram of the receiving side of the modem of a universal transmitting/receiving device which makes use of the method for automatic adaptation to the type of DPSK of the incoming signal (s'(nTs) has at its input an equalizer EZ, via which the incoming signal is passed to a demodulator DEM. In the demodulator DEM, the pair of signals consisting of the received in-phase signal I'(nT/2) and the received quadrature signal Q'(nT/2) is recovered from the incoming signal s'(nTs). For this purpose, the incoming signal is again fed to the first input of a mixer M1 and M2. At the second input of the mixer M1, the carrier oscillation of the clock generator TG is again directly present and at the second input of the mixer M2 it is present via a 90° phase-rotating element PH1. At the output of the mixers, the high frequency components are suppressed via low-pass filters TP and the received signal pair recovered in this manner is fed to the input of the decoding arrangement DCA.

The received in-phase signal I'(nT/2) and the received quadrature signal Q'(nT/2) at the output of the demodulator are also fed to the type-of-modulation recognition circuit MODE and to a clock and carrier regenerating circuit TR. The clocks TK fed to the various circuit parts from the clock and carrier regenerating circuit TR are only indicated by outgoing lines in FIG. 4.

The type-of-modulation recognition circuit MODE exhibits at its input a converter UF1 which converts the in-phase signal and the quadrature signal into a polar co-ordinate representation with the phase angle $\phi$ and the absolute value A and subsequently feeds the phase angle information and the absolute value information to the decision circuit E1. This decision circuit E1 is followed by the actual histogram generator HG which generates the accumulation diagram needed for the recognition of the type of modulation and feeds the result to an evaluation circuit AW for obtaining the control information needed for adjusting the decoding arrangement DCA.

The decoding arrangement DCA itself consists of a decision circuit E and a decoder DC which follows the decision circuit and at the output of which the original transmitted useful digital information d'(nT) and d'(n2T) can be picked up. The input equalizer EC is correctly adjusted in dependence on the setting of the decision circuit E of the decoding arrangement DCA.

Figure 5:
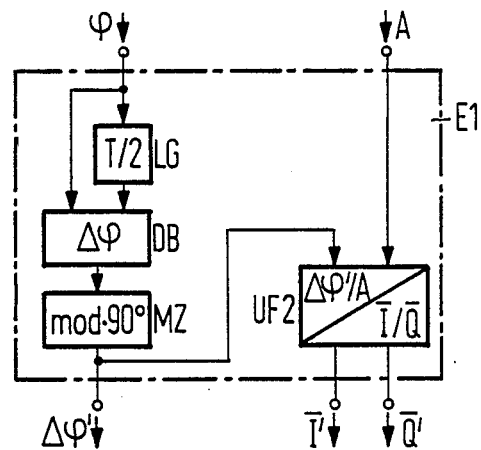
FIG. 5 is a block diagram illustrating greater details of the decision circuit according to FIG. 4 which is arranged to precede the histogram generator.

The block diagram according to FIG. 5, which represents greater details of the decision circuit E1 according to FIG. 4, exhibits a difference angle forming circuit DB, the input of which is supplied with the information relating to the phase angle $\phi$ directly at one input and via a delay section LG at the other input. The propagation delay of the delay section LG is one clock period. The difference phase angle $\Delta\phi$ at the output of the difference angle forming circuit DB is converted via the multiplier MZ into the modulo 90° differential phase angle signal and made available to the histogram generator HG.

Figure 7:
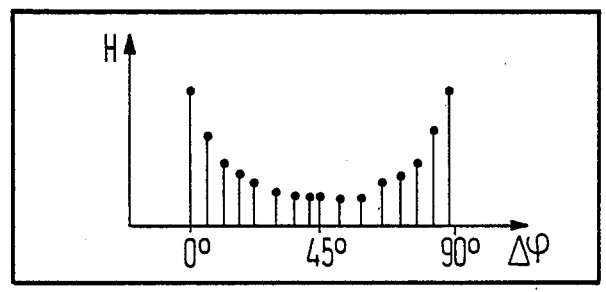
FIG. 7 is a one-dimensional histogram representing DPSK type V26 bis A according to CCITT Recommendation.
Figure 8:
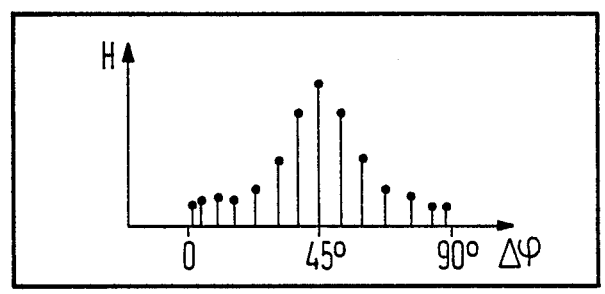
FIG. 8 is a one-dimensional histogram representing DPSK type V26 bis B according to CCITT Recommendation.

In the case of a 4 DPSK V 26 bis A/B according to CCITT Recommendation, this signal is sufficient for the histogram generator to represent the value frequency H against the difference phase angle $\Delta\phi$ within the angular range of between 0° and 90° because the absolute value A is constant in this case. Of the one-dimensional histograms shown in FIGS. 7 and 8, FIG. 7 shows the characteristic variation of the value frequency H against the difference phase angle $\Delta\phi$ between 0° and 90° for a 4 DPSK corresponding to V26 bis A according to CCITT Recommendation, and FIG. 8 shows this for a 4 DPSK corresponding to V26 bis B according to CCITT Recommendation. The evaluation of such a histogram requires recognition of the difference phase angle range in which a peak of the frequency occurs.

As can be seen in the block diagram according to FIG. 5, the decision circuit E1 also has a converter UF2, the input of which is supplied with the modulo 90° difference phase angle $\Delta\phi'$ and the absolute value A. The converter UF2 in turn converts these signal values in polar co-ordinates into a Cartesian co-ordinate representation and at its output makes it available to the histogram generator HG according to FIG. 4 as a reconverted in-phase signal $\bar{I}'$ and quadrature signal $\bar{Q}'$ for building up a two-dimensional histogram.

Figure 9:
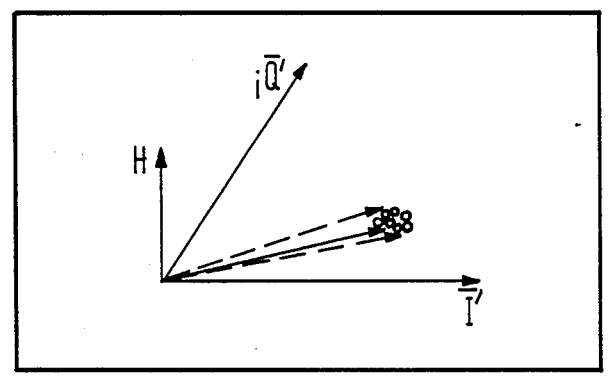
FIG. 9 is a two-dimensional histogram representing DQAM type V22 bis according to CCITT Recommendation.

Construction of a two-dimensional histogram is required if as is the case with 16 DQAM according to V22 bis according to CCITT Recommendation, the carrier oscillation modulated at the transmitting side is modulated by the useful signal information not only with respect to its phase but also with respect to its amplitude. If the 16 DQAM modulation is used, a short section is usually transmitted at the beginning of the transmission in the form of a training signal in which the carrier oscillation is modulated in four phases, which are shifted by 90° with respect to one another, with a constant amplitude. The relevant two-dimensional histogram in which the reconverted in-phase signal $\bar{I}'$ is plotted along the real axis and the reconverted quadrature signal $\bar{Q}'$ is plotted along the imaginary axis, is shown in FIG. 9. Here, too, a maximum of the value frequency H is obtained which is typical of this type of modulation and can be evaluated for the adjustment of the decoding arrangement DCA.

Figure 6:
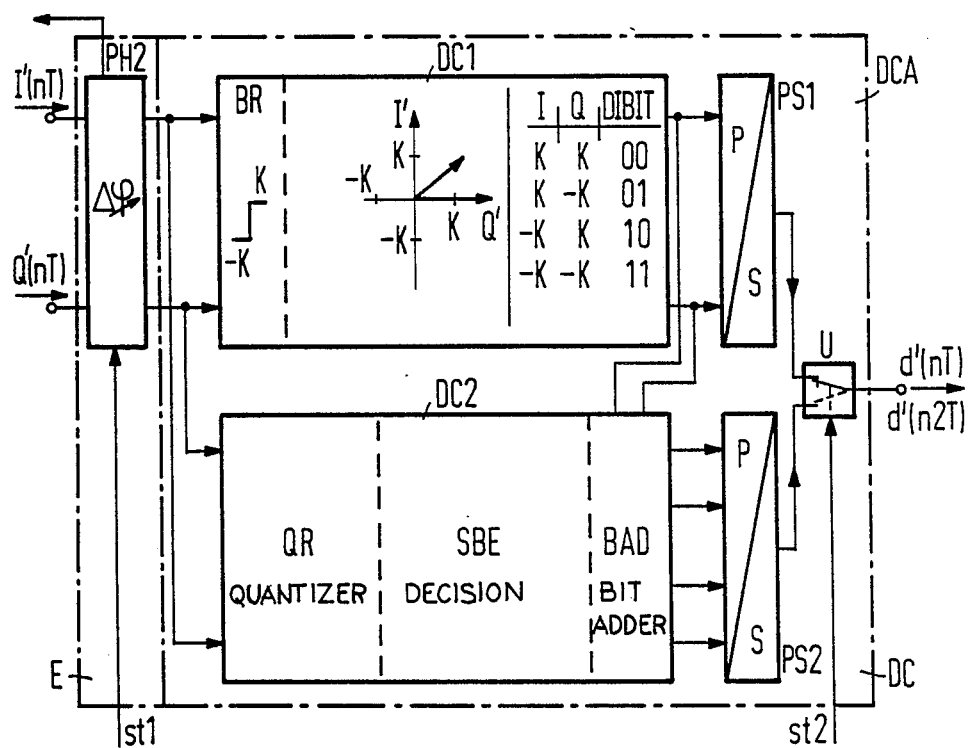
FIG. 6 is a basic circuit diagram, illustrating greater details, of the decoding arrangement according to FIG. 4.

A block diagram illustrating greater details of a decoding arrangement DCA according to FIG. 4 is also shown in FIG. 6. The decision circuit E at the input consists of an adjustable phase-rotating element PH2. The control input of this phase-rotating element is supplied by the evaluating circuit AW of the type-of-modulation recognition circuit MODE according to FIG. 4 with a control signal st1 in dependence on the recognized type of modulation of the incoming signal s'(nTs). The decoder DC consists of the decoder DC1 for the phase angle and of the decoder DC2 for the amplitude. The decoder DC2 is not needed if the type of modulation used in the incoming signal is 4 DPSK which has no amplitude modulation of the carrier oscillation.

The two decoders DC1 and DC2 are connected in parallel with the output of the decision circuit E. At its output, the decoder DC1 has a parallel serial converter PS1 which again combines the bit streams, which are parallel to one another, at the two outputs of the decoder DC1 to form the signal representing the transmitted original useful digital information d'(nT). The output signal of the decision circuit E is first limited to a constant amplitude $+K$ in the limiter BR in the decoder DC1 for the phase. The actual decoder DC1 for the phase is dimensioned for decoding a 4 DPSK corresponding to V26 bis B according to CCITT Recommendation and delivers, in accordance with the occurring difference phases of 45°, 135°, 225°, and 315°, the corresponding binary bits at its two outputs to the parallel/serial converter PS1. If the type-of-modulation recognition circuit MODE recognizes in the incoming signal as a 4 DPSK corresponding to V26 bis A according to CCITT Recommendation, it then delivers a control signal st1 to the phase adjusting element PH2 which rotates the signals passing through the phase adjusting element PH2, namely the in-phase signal I'(nT) and the quadrature signal Q'(nT) by $+45°$ and thus converts the V26 bis A type of modulation into the V26 bis B type of modulation according to CCITT Recommendation for the decoder DC1. At the same time, the type-of-modulation recognition circuit MODE delivers to the output change-over switch U of the decoding arrangement DCA a control signal st2 which changes the change-over switch U into the switch position shown in the drawing.

The decoder DC2 for the amplitude comes into operation if it is not only the carrier phases but also the carrier amplitude which are modulated in the incoming signal, as is the case in 16 DQAM according to V22 bis in accordance with CCITT Recommendation. The decoder DC2 exhibits at its input a quantizer QR which is followed by a sub-bit decision circuit SBE. The sub-bit decision circuit SBE is followed by a bit adder BAD which is also fed with, apart from the two sub-bits exhibiting the amplitude information, the bits representing the phase information from the output of the decoder DC1. The four parallel bits in each case are subsequently combined in the parallel/serial converter PS2 into useful output information d'(n2T) to be transmitted and delivered to the output via the change-over switch U. For this purpose, the change-over switch U then receives a control signal st2 from the type-of-modulation recognition circuit, which changes it into the switch position drawn with a broken line.

To prevent a loss of information in the time interval needed by the type-of-modulation recognition circuit MODE for recognizing the type of modulation of the incoming signal s'(nTs) and producing the necessary adaptation of the decoding arrangement DCA, a buffer store ZS can be provided, as shown with a broken line in FIG. 4, in the signal path between the output of the demodulator DEM and the input of the decoding arrangement DCA, via which the received in-phase signal I'(nT/2) and the quadrature signal Q'(nT/2) are fed to the decoding arrangement DCA with a time delay arranged for bridging this time interval.

The method according to the present invention can be advantageously utilized in transmitting/receiving devices for differential phase-modulated signals wherever there is a requirement for individual subscribers in networks with groups of transmitting/receiving devices making use of different differential phase modulation, to be able to communicate with any subscriber in the network by using a universal transmitting/receiving device.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for receiving incoming signals in the form of carrier oscillations modulated by a useful signal, comprising the steps of: demodulating the incoming signal, which is a digital signal modulated onto the carrier oscillation by using a predetermined phase modulation to produce a pair of signals, an in-phase signal (I' (nT)) and a quadrature signal (Q' (nT)); feeding the pair of signals to a decoding arrangement having at least a decision circuit and a decoder; also converting the pair of signals into a polar coordinate representation of a phase angle ($\phi$) and absolute value (A); forming a difference phase angle ($\Delta\phi$) between the phase angle ($\phi$) and successively following phase angles ($\phi$) in a histogram determining a value frequency (H) in a quadrant for the difference phase angle ($\Delta\phi$) to provide control information; feeding the control information to the decision circuit in the decoding arrangement in the form of a first control signal (st1), used for phase adjustment of the decision circuit in the decoding arrangement and to the decoder in the decoding arrangement in the form of a second control signal, wherein the type of modulation of the incoming signal is first determined with the aid of the histogram and then the control information is produced for adapting the circuit recovering the useful signal to the type of modulation determined.

2. The method according to claim 1, wherein the pair of signals (I'(nT), Q'(nT)), recovered from the incoming signal by demodulation, is fed to the decoding arrangement via a buffer store which bridges the time for the determination of the type of modulation and adjustment of the decoding arrangement.

3. The method according to claim 1 wherein the value frequency (H) of the difference phase angles ($\Delta\phi$) is represented modulo 90° in the histogram and the type of modulation is recognized from the difference phase angle ranges within which peaks of the value frequency occur.

4. The method according to claim 1 wherein the predetermined phase modulation is a four-phase differential phase modulation (4 DPSK) in two possible variants.

5. The method according to claim 1 wherein the predetermined phase modulation is a sixteen-phase differential phase modulation (16 DQAM).

6. The method according to claim 5 wherein, for the recognition of the incoming signal with 16 DQAM, the carrier is briefly evaluated at the beginning in a "training mode" with only a particular pair of values of difference phase angle ($\Delta\phi$) and absolute value (A) per quadrant for the representation of a two-dimensional histogram referred to one quadrant.

7. A method for receiving incoming signals in the form of carrier oscillations modulated by a useful signal, comprising the steps of: demodulating the incoming signal, which is a digital signal modulated onto the carrier oscillation by using a four-phase differential phase modulation (4 KPSK) in two possible variants to produce a pair of signals, an in-phase signal (I' (nT)) and a quadrature signal (Q' (nT)); feeding the pair of signals to a decoding arrangement having at least a decision circuit and a decoder; also converting the pair of signals into a polar co-ordinate representation of a phase angle ($\phi$) and absolute value (A); forming a difference phase angle ($\Delta\phi$) between the phase angle ($\phi$) and successively following phase angles ($\phi$) in a histogram determining a value frequency (H) in a quadrant for the difference phase angle ($\Delta\phi$) to provide control information; feeding the control information to the decision circuit in the decoding arrangement in the form of a first control signal (st1), used for phase adjustment of the decision circuit in the decoding arrangement and to the decoder in the decoding arrangement in the form of a second control signal, wherein the type of modulation of the incoming signal is first determined with the aid of the histogram and then the control information is produced for adapting the circuit recovering the useful signal to the type of modulation determined.

8. The method according to claim 7 wherein the pair of signals (I'(nT), Q'(nT)), recovered from the incoming signal by demodulation, is fed to the decoding arrangement via a buffer store which bridges the time for the determination of the type of modulation and adjustment of the decoding arrangement.

9. The method according to claim 7 wherein the value frequency (H) of the difference phase angles ($\Delta\phi$) is represented modulo 90° in the histogram and the type of modulation is recognized from the difference phase angle ranges within which peaks of the value frequency occur.

10. A method for receiving incoming signals in the form of carrier oscillations modulated by a useful signal, incoming signal is first determined with the aid of a histogram and from this a control information is produced for adapting a circuit recovering the original signal to the type comprising the steps of: demodulating the incoming signal, which is a digital signal modulated onto the carrier oscillation by using a sixteen-phase-differential phase modulation (16 DQAM) to produce a pair of signals, an in-phase signal (I' (nT)) and a quadrature signal (Q' (nT)); feeding the pair of signals to a decoding arrangement having at least a decision circuit and a decoder; also converting the pair of signals into a polar co-ordinate representation of a phase angle ($\phi$) and absolute value (A); forming a difference phase angle ($\Delta\phi$) between the phase angle ($\phi$) and successively following phase angles ($\phi$) in a histogram determining a value frequency (H) in a quadrant for the difference phase angle ($\Delta\phi$) to provide control information; feeding the control information to the decision circuit in the decoding arrangement in the form of a first control signal (st1), used for phase adjustment of the decision circuit in the decoding arrangement and to the decoder in the decoding arrangement in the form of a second control signal, wherein the type of modulation of the incoming signal is first determined with the aid of the histogram and then the control information is produced for adapting the circuit recovering the useful signal to the type of modulation determined.

11. The method according to claim 10 wherein that the pair of signals (I'(nT), Q'(nT)), recovered from the incoming signal by demodulation, is fed to the decoding arrangement via a buffer store which bridges the time for the determination of the type of modulation and adjustment of the decoding arrangement.

12. The method according to claim 10 wherein the value frequency (H) of the difference phase angles ($\Delta\phi$) is represented modulo 90° in the histogram and the type of modulation is recognized from the difference phase angle ranges within which peaks of the value frequency occur.

13. The method according to claim 10 wherein, for the recognition of an incoming signal with 16 DQAM, the carrier is briefly evaluated at the beginning in a "training mode" with only a particular pair of values of difference phase angle ($\Delta\phi$) and absolute value (A) per quadrant for the representation of a two-dimensional histogram referred to one quadrant.

* * * * *